United States Patent
Turner, Jr. et al.

(10) Patent No.: US 7,672,542 B2
(45) Date of Patent: Mar. 2, 2010

(54) IMAGE FRAME ABSTRACTION MODEL FOR IMAGE CODECS

(75) Inventors: Richard S. Turner, Jr., Woodinville, WA (US); David Albert, Woodinville, WA (US); Tomasz S. M. Kasperkiewicz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1066 days.

(21) Appl. No.: 11/111,355

(22) Filed: Apr. 20, 2005

(65) Prior Publication Data

US 2006/0239590 A1    Oct. 26, 2006

(51) Int. Cl.
G06K 9/54 (2006.01)
H04N 1/00 (2006.01)
G06F 17/00 (2006.01)

(52) U.S. Cl. .................. 382/305; 382/306; 358/403; 707/100

(58) Field of Classification Search .................. 382/305
See application file for complete search history.

(56) References Cited

U.S. PATENT DOCUMENTS

| | | | | |
|---|---|---|---|---|
| 5,586,316 A * | 12/1996 | Tanaka et al. | ................. | 707/4 |
| 5,666,215 A * | 9/1997 | Fredlund et al. | ............ | 358/487 |
| 6,072,586 A * | 6/2000 | Bhargava et al. | ........... | 358/1.15 |
| 6,829,624 B2 * | 12/2004 | Yoshida | ...................... | 707/205 |
| 6,993,196 B2 * | 1/2006 | Sun et al. | ..................... | 382/233 |
| 7,307,636 B2 * | 12/2007 | Matraszek et al. | .......... | 345/581 |
| 7,447,369 B2 * | 11/2008 | Gormish et al. | ............. | 382/235 |
| 7,460,724 B2 * | 12/2008 | Gormish | ..................... | 382/240 |
| 7,548,927 B2 * | 6/2009 | Turner, Jr. et al. | ........... | 707/101 |
| 2003/0028896 A1 * | 2/2003 | Swart et al. | ................. | 725/127 |
| 2004/0189695 A1 | 9/2004 | Kurtz et al. | | |
| 2005/0203920 A1 * | 9/2005 | Deng et al. | ................. | 707/100 |
| 2006/0088228 A1 * | 4/2006 | Marriott et al. | ............. | 382/305 |

* cited by examiner

*Primary Examiner*—Andrew W Johns
*Assistant Examiner*—Jose M Torres
(74) *Attorney, Agent, or Firm*—Workman Nydegger

(57) ABSTRACT

A method and architecture for obtaining a desired frame and identifying a selected frame in an image container. A request for a frame of an image is received. The request may include an identifier that identifies a type of frame. In response thereto, a frame is located corresponding to the identifier and a reference to the frame is provided. In another aspect, a request is received to identify a frame of an image. A determination is made as to what identifier identifies the frame. The identified frame is returned to the requesting component.

16 Claims, 10 Drawing Sheets

IMAGE FRAME ABSTRACTION MODEL FOR IMAGE CODECS

FIELD OF THE INVENTION

The invention relates generally to computers, and more particularly to images.

BACKGROUND

An image may have several frames—logical and physical—associated with it. A frame may comprise an alternate or specialized representation of the main image or may comprise a separate image in the same container that includes the main image. For example, a typical image container may include a thumbnail frame and a full-resolution image frame. As another example, a Tiff file representing a fax may have several frames in it, each representing a different page of the fax. The data associated with physical frames of an image is usually stored in a container associated with the image. The container may include one or more physical frames and metadata regarding the image.

A physical frame comprises data that is stored in the container that may be used to display a view of the image. For example, a camera picture image container may include a frame that includes raw sensor data of the image.

The data of a logical frame, on the other hand, is not stored in the container of an image; rather, a logical frame may be created upon demand from image data. For example, a preview frame may be created from image data and displayed upon demand. The preview frame may be cached in memory or disposed of after use, but need not be stored in the container.

It may be desirable to associate other frames such as embedded preview, fast preview, full resolution image, and the like with an image. What is needed is a method and system for obtaining a desired frame or identifying a selected frame.

SUMMARY

Briefly, the present invention provides a method and architecture for obtaining a desired frame. A request for a frame of an image is received. The request may include an identifier that identifies a type of frame. In response thereto, a frame is located corresponding to the identifier and a reference (e.g., pointer) to the frame is provided.

In another aspect, a selected frame is identified. A request is received to identify a frame of an image. A determination is made as to what identifier identifies the frame. The identifier is returned to the requesting component.

In another aspect, an application programming interface is provided that receives a name parameter. The name parameter identifies a type of frame. In response to receiving the name parameter, a function operates on the name parameter and frames of an image, obtains a reference to a frame of a type corresponding to the parameter.

Other aspects will become apparent from the following detailed description when taken in conjunction with the drawings, in which:

DETAILED DESCRIPTION

Exemplary Operating Environment

Figure 1:
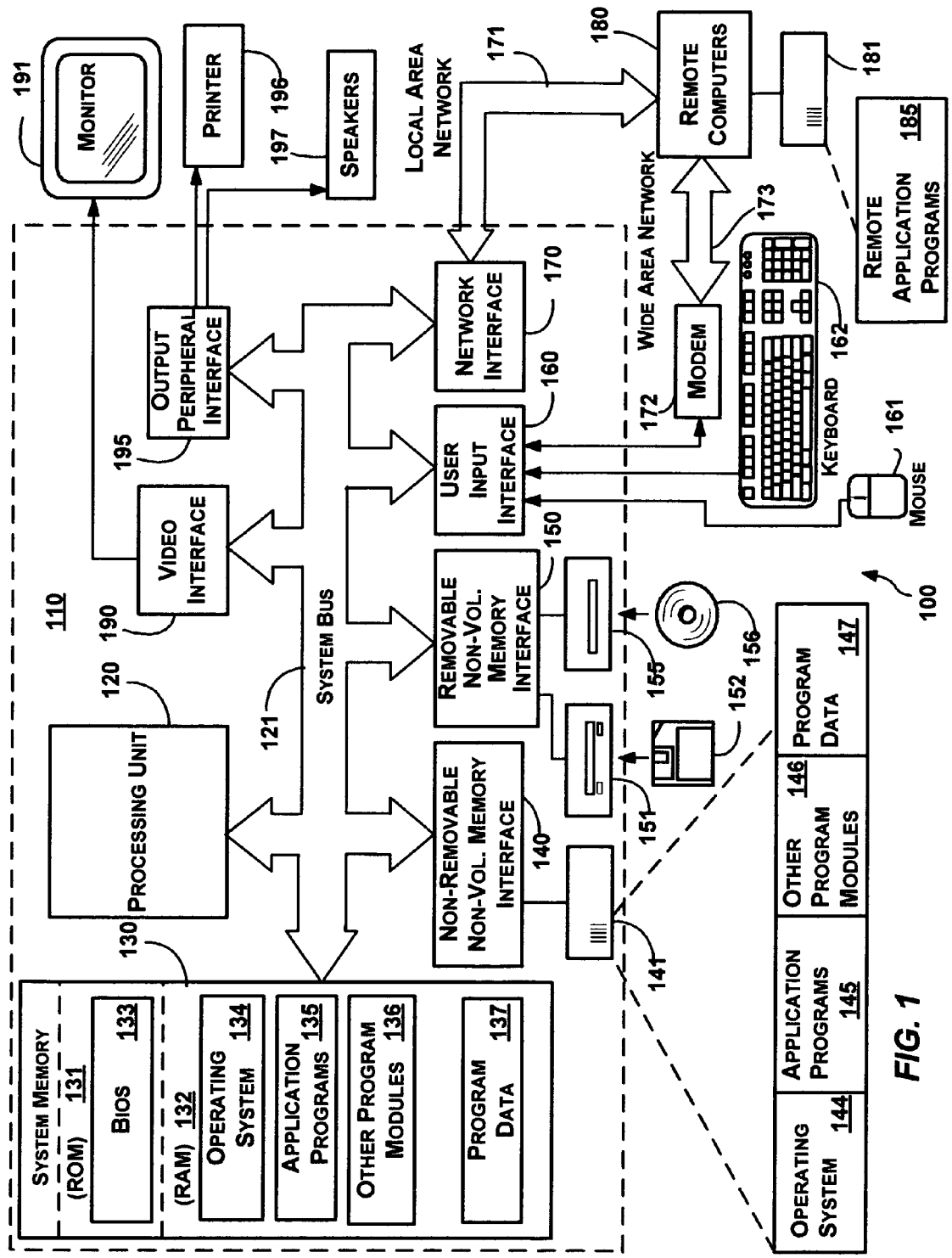
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Interfaces

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), and the like of a component of a system capable of communicative coupling to one or more mechanism(s), method(s), function call(s), module(s), and the like of other component(s). The term "segment of code" is intended to include one or more instructions or lines of code, and includes, for example, code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 2A:
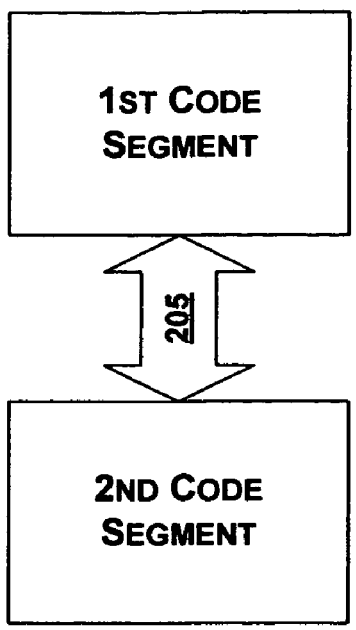
FIGS. 2A-6B are block diagrams generally representing exemplary application programming interfaces that may operate in accordance with various aspects of the invention.
Figure 2B:
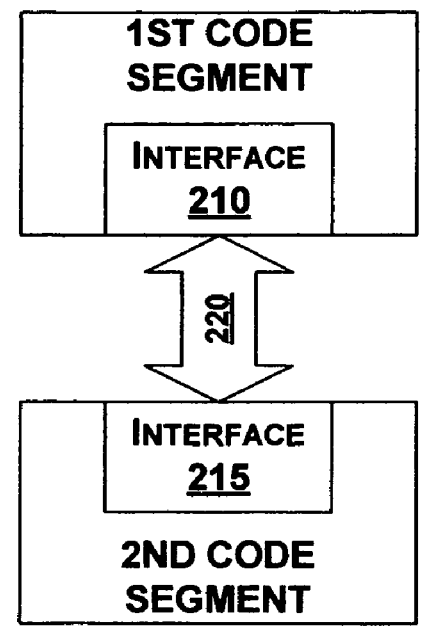

Notionally, a programming interface may be viewed generically, as shown in FIG. 2A or FIG. 2B. FIG. 2A illustrates an interface 205 as a conduit through which first and second code segments communicate. FIG. 2B illustrates an interface as comprising interface objects 210 and 215 (which may or may not be part of the first and second code segments), which enable first and second code segments of a system to communicate via medium 220. In the view of FIG. 2B, one may consider interface objects 210 and 215 as separate interfaces of the same system and one may also consider that objects 210 and 215 plus medium 220 comprise the interface. Although FIGS. 2A and 2B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing, and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g., information placed in a buffer, file, etc. separate from information flow between the code segments) or non-existent, as when one code segment simply accesses functionality performed by a second code segment. Any or all of these aspects may be important in a given situation, for example, depending on whether the code segments are part of a system in a loosely coupled or tightly coupled configuration, and so this list should be considered illustrative and non-limiting.

This notion of a programming interface is known to those skilled in the art and is clear from the foregoing detailed description. There are, however, other ways to implement a programming interface, and, unless expressly excluded, these too are intended to be encompassed by the claims set forth at the end of this specification. Such other ways may appear to be more sophisticated or complex than the simplistic view of FIGS. 2A and 2B, but they nonetheless perform a similar function to accomplish the same overall result. Below are some illustrative alternative implementations of a programming interface.

A. Factoring

Figure 3A:
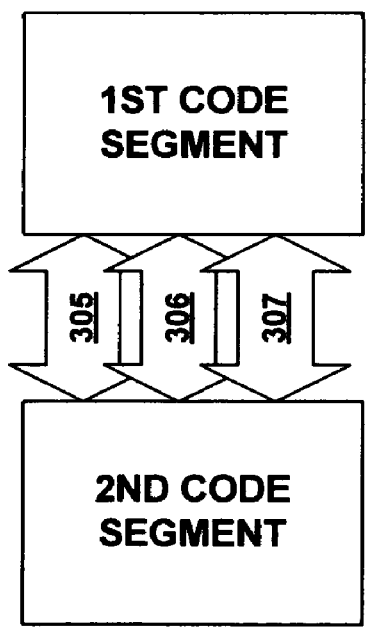

A communication from one code segment to another may be accomplished indirectly by breaking the communication into multiple discrete communications. This is depicted schematically in FIGS. 3A and 3B. As shown, some interfaces can be described in terms of divisible sets of functionality. Thus, the interface functionality of FIGS. 2A and 2B may be factored to achieve the same result, just as one may mathematically provide 24 as 2 times 2 times 3 times 2. Accordingly, as illustrated in FIG. 3A, the function provided by interface 205 may be subdivided to convert the communications of the interface into multiple interfaces 305, 306, 307, and so on while achieving the same result.

Figure 3B:
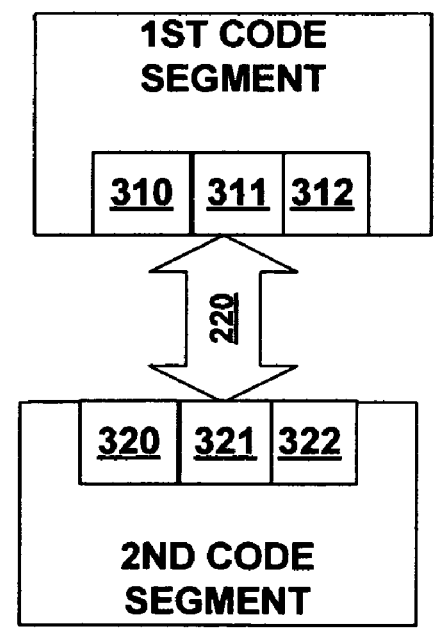

As illustrated in FIG. 3B, the function provided by interface 210 may be subdivided into multiple interfaces 310, 311, 312, and so forth while achieving the same result. Similarly, interface 215 of the second code segment which receives information from the first code segment may be factored into multiple interfaces 320, 321, 322, and so forth. When factoring, the number of interfaces included with the $1^{st}$ code segment need not match the number of interfaces included with the $2^{nd}$ code segment. In either of the cases of FIGS. 3A and 3B, the functional spirit of interfaces 205 and 210 remain the same as with FIGS. 2A and 2B, respectively.

The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 4A:
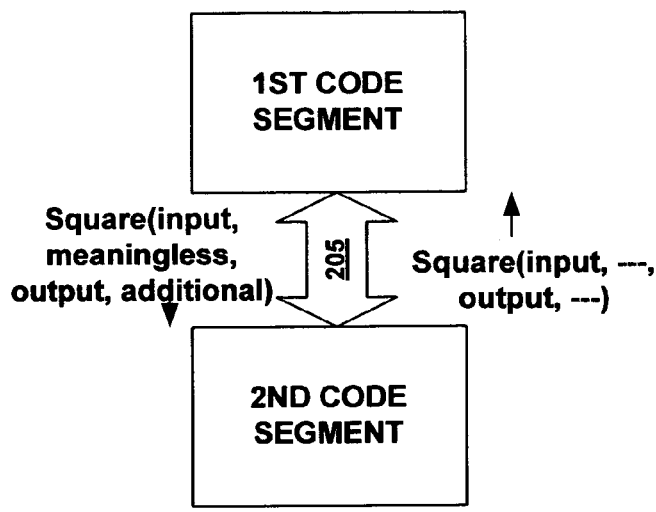
Figure 4B:
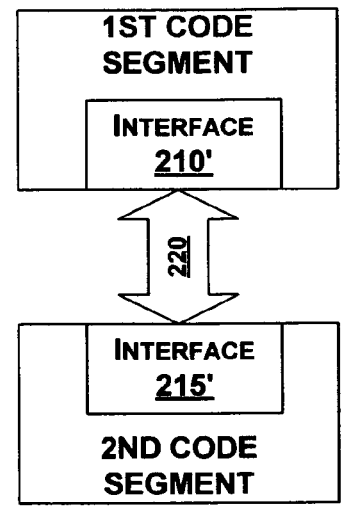

In some cases, it may be possible to ignore, add, or redefine certain aspects (e.g., parameters) of a programming interface while still accomplishing the intended result. This is illustrated in FIGS. 4A and 4B. For example, assume interface 205 of FIG. 2A includes a function call Square(input, precision, output), that includes three parameters, input, precision and output, and which is issued from the $1^{st}$ Code Segment to the $2^{nd}$ Code Segment. If the middle parameter precision is of no concern in a given scenario, as shown in FIG. 4A, it could just as well be ignored or even replaced with a meaningless (in this situation) parameter. An additional parameter of no concern may also be added. In either event, the functionality of square can be achieved, so long as output is returned after input is squared by the second code segment.

Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 4B, interface 210 is replaced by interface 210', redefined to ignore or add parameters to the interface. Interface 215 may similarly be redefined as interface 215', redefined to ignore unnecessary parameters, or parameters that may be processed elsewhere. As can be seen, in some cases a programming interface may include aspects, such as parameters, that are not needed for some purpose, and so they may be ignored or redefined, or processed elsewhere for other purposes.

C. Inline Coding

Figure 5A:
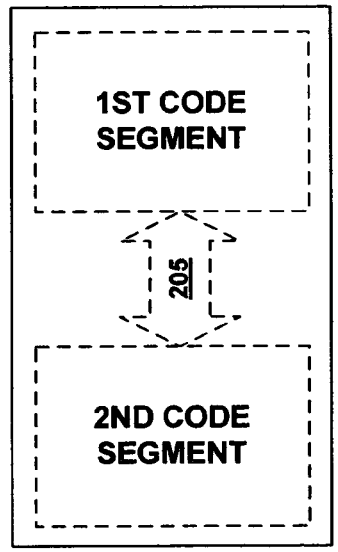
Figure 5B:
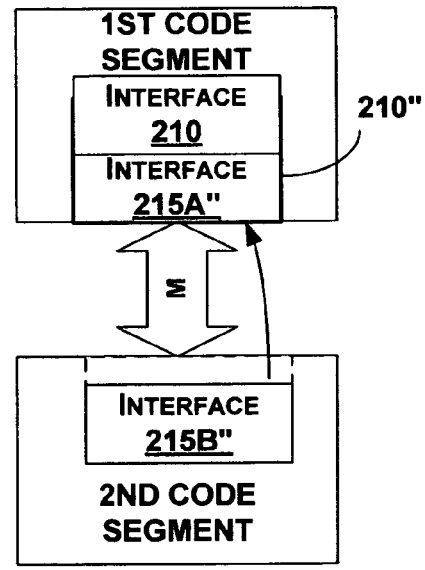

It may also be feasible to merge some or all of the functionality of two separate code modules such that the "interface" between them changes form. For example, the functionality of FIGS. 2A and 2B may be converted to the functionality of FIGS. 5A and 5B, respectively. In FIG. 5A, the previous $1^{st}$ and $2^{nd}$ Code Segments of FIG. 2A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface 205 may still be in effect. Similarly, shown in FIG. 5B, part (or all) of interface 215 from FIG. 2B may be written inline into interface 210 to form interface 210". As illustrated, interface 215 is divided into 215A" and 215B", and interface portion 215A" has been coded in-line with interface 210 to form interface 210".

For a concrete example, consider that the interface 210 from FIG. 2B may perform a function call square (input, output), which is received by interface 215, which after processing the value passed with input (to square it) by the second code segment, passes back the squared result with output. In such a case, the processing performed by the second code segment (squaring input) can be performed by the first code segment without a call to the interface.

D. Divorce

Figure 6A:
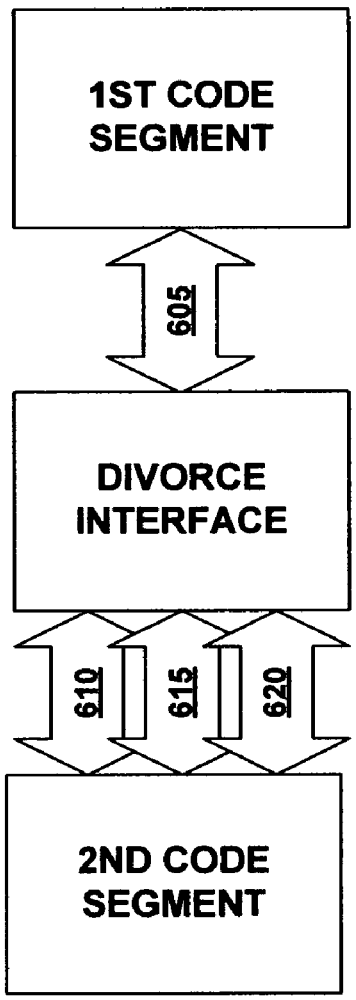

A communication from one code segment to another may be accomplished indirectly by breaking the communication into multiple discrete communications. This is depicted schematically in FIGS. 6A and 6B. As shown in FIG. 6A, one or more piece(s) of middleware (Divorce Interface(s), since they divorce functionality and/or interface functions from the original interface) are provided to convert the communications on the first interface 605, to conform them to a different interface, in this case interfaces 610, 615, and 620. This might be done, for example, where there is an installed base of applications designed to communicate with, say, an operating system in accordance with the first interface 605's protocol, but then the operating system is changed to use a different interface, in this case interfaces 610, 615, and 620. It can be seen that the original interface used by the $2^{nd}$ Code Segment is changed such that it is no longer compatible with the interface used by the $1^{st}$ Code Segment, and so an intermediary is used to make the old and new interfaces compatible.

Figure 6B:
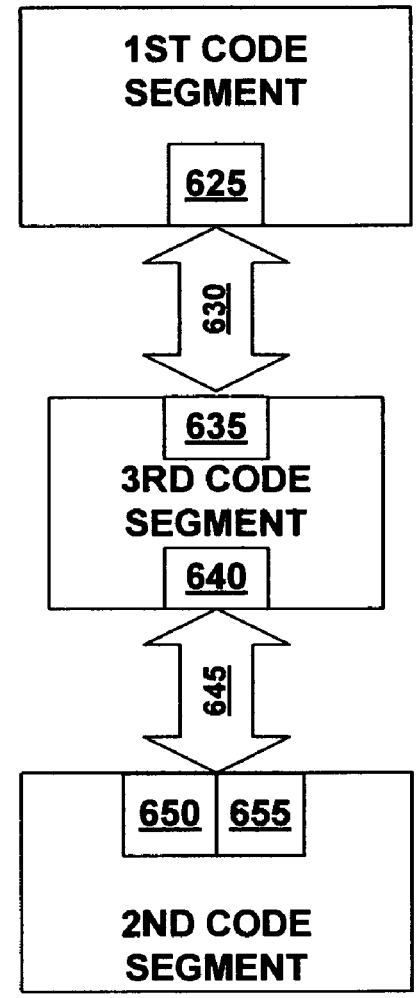

Similarly, as shown in FIG. 6B, a third code segment can be introduced with divorce interface 635 to receive the communications from interface 630 and with divorce interface 640 to transmit the interface functionality to, for example, interfaces 650 and 655, redesigned to work with 640, but to provide the same functional result. Similarly, 635 and 640 may work together to translate the functionality of interfaces 210 and 215 of FIG. 2B to a new operating system, while providing the same or similar functional result.

E. Rewriting

Yet another possible variant is to dynamically rewrite the code to replace the interface functionality with something else but which achieves the same overall result. For example, there may be a system in which a code segment presented in an intermediate language (e.g. Microsoft IL, Java® Byte-Code, etc.) is provided to a Just-in-Time (JIT) compiler or interpreter in an execution environment (such as that provided by the .Net framework, the Java® runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 7 and 8.

Figure 7:
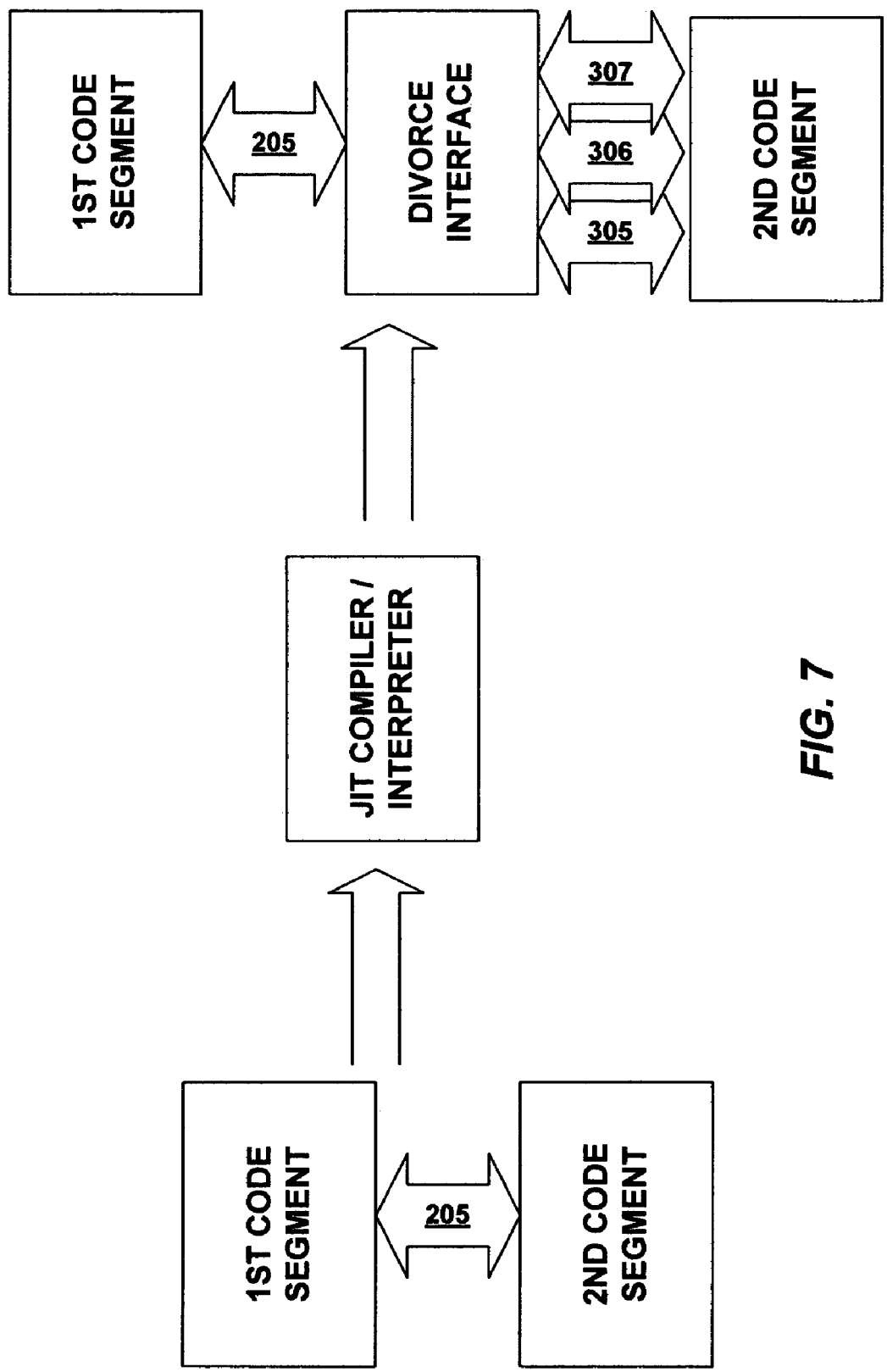
FIGS. 7 and 8 are block diagrams that generally represent how a compiler or interpreter may transform one or more interfaces to one or more other interfaces in accordance with various aspects of the invention.
Figure 8:
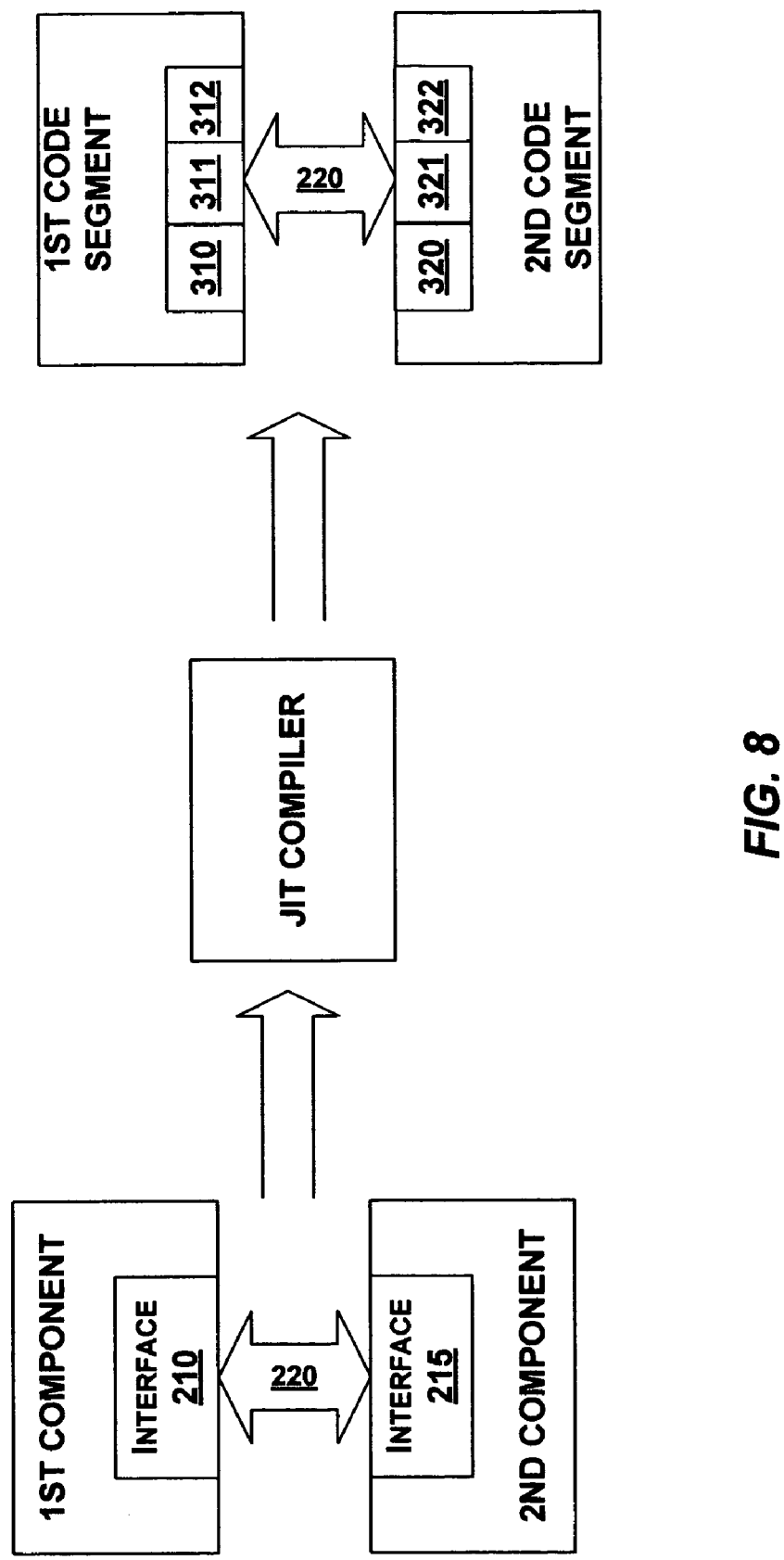

As can be seen in FIG. 7, this approach is similar to the Divorce scenario described above. It might be done, for example, where an installed base of applications are designed to communicate with an operating system in accordance with a first interface protocol, but then the operating system is changed to use a different interface. The JIT Compiler may be used to conform the communications on the fly from the installed-base applications to the new interface of the operating system. As depicted in FIG. 8, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched, and combined to produce the same or equivalent scenarios to the generic scenarios presented in FIGS. 2A and 2B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Obtaining Frame by Frame Type and Frame Type of Selected Frame

Figure 9:
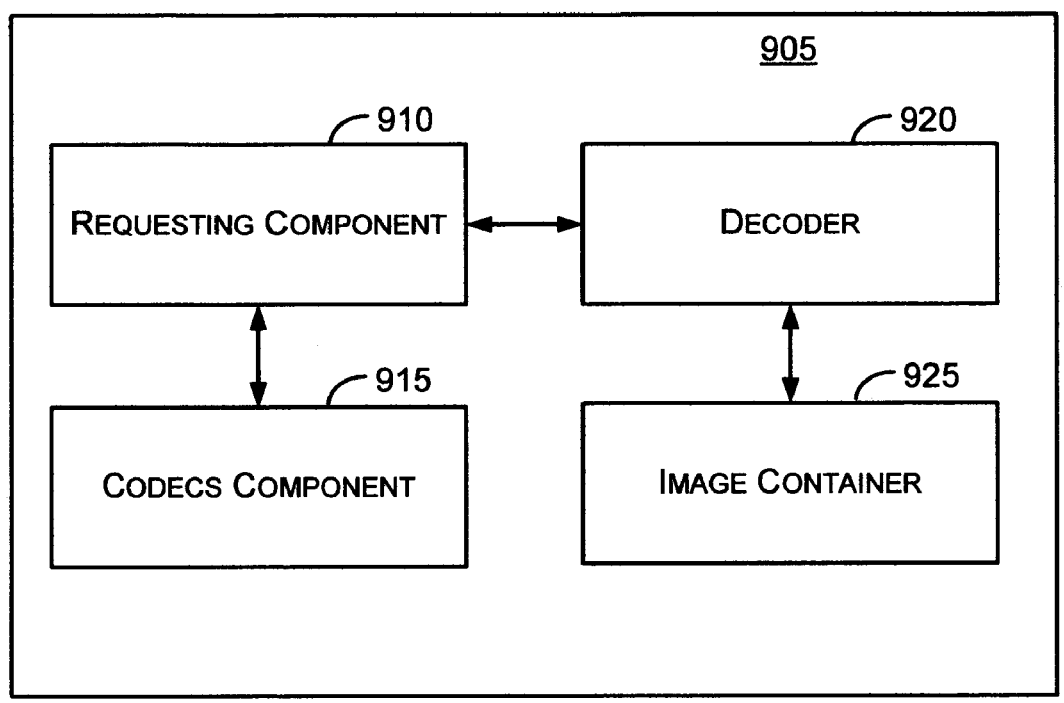
FIG. 9 is a block diagram representing an exemplary environment in which the present invention may operate in accordance with various aspects of the invention.

FIG. 9 is a block diagram representing an exemplary environment in which the present invention may operate in accordance with various aspects of the invention. The environment 905 includes a requesting component 910, a codecs component 915, a decoder 920, and an image container 925.

Each of the requesting component 910, the codecs component 915, and the decoder 920 may comprise code that executes on or hardware associated with a computer, such as the computer system 120 of FIG. 1, and may comprise a conventional application program, an operating system component or utility, a control, an application programming interface (API) (as described in conjunction with FIGS. 2A-8), a hardware device, a combination of the above, and so forth.

In one embodiment, the requesting component 910 instantiates a decoder by communicating with the codecs component 915 and passing a file name or stream object. After instantiating the decoder 920, the requesting component 910 may then request a frame from the decoder 920 by passing a frame type (e.g., "preview") to the decoder 920. If the frame comprises a logical frame, the decoder 920 may then construct the frame or retrieve it from cache if it was previously constructed and cached in memory. If the frame is a physical frame, the decoder 920 may retrieve the frame from the image container 925. The decoder 920 may then pass a pointer to the frame (or an object that includes the frame) to the requesting component 910.

In accordance with an aspect of the present invention, the requesting component 910 may request a frame by frame type from the decoder 920. For example, the requesting component 910 may send a string (e.g., "preview") to the decoder 920 to request a particular type of frame (e.g., the preview frame). As another example, the requesting component may send a globally unique identifier (GUID) that identifies a particular type of frame. Upon receiving a request for a frame by frame type, the decoder 920 searches the image container 925 (or an index related thereto) to obtain a frame corresponding to the name. If the frame exists or can be constructed by the decoder 920, the decoder returns the appropriate frame to the requesting component 910. Otherwise, an error code may be returned.

In the past, decoders did not generally have the ability to return frames by frame name. It was up to the requesting component 910 to determine based on size or some other characteristic of the frame what type of frame the decoder 920 had provided.

In accordance with another aspect of the present invention, the requesting component 910 may enumerate through the frames provided by the decoder 920 and may query the decoder 920 as to the type of any particular frame. In response to such a query, the decoder 920 may return a string or (GUID) identifying the type of frame or a value in an enumeration.

In one embodiment, the decoder 920 recognizes a "canonical" set of frame names including thumbnail, raw sensor data, embedded preview, fast screen resolution preview, and full resolution image. If an exact match for a frame does not exist in an image container, the decoder 920 may return a closest match. For example, the decoder 920 may receive a request for a preview frame. A container may store a thumbnail frame and a full image frame. In response to the request, the decoder 920 may determine whether the thumbnail frame or the full image frame is closest in size to the size of the preview frame and return either the thumbnail frame or the full image frame accordingly.

In one embodiment, the set of frames may be locked and not modifiable except through a codecs update. In another embodiment, the set of frames may be modified by an application, user, or otherwise without departing from the spirit or scope of the present invention.

Figure 10:
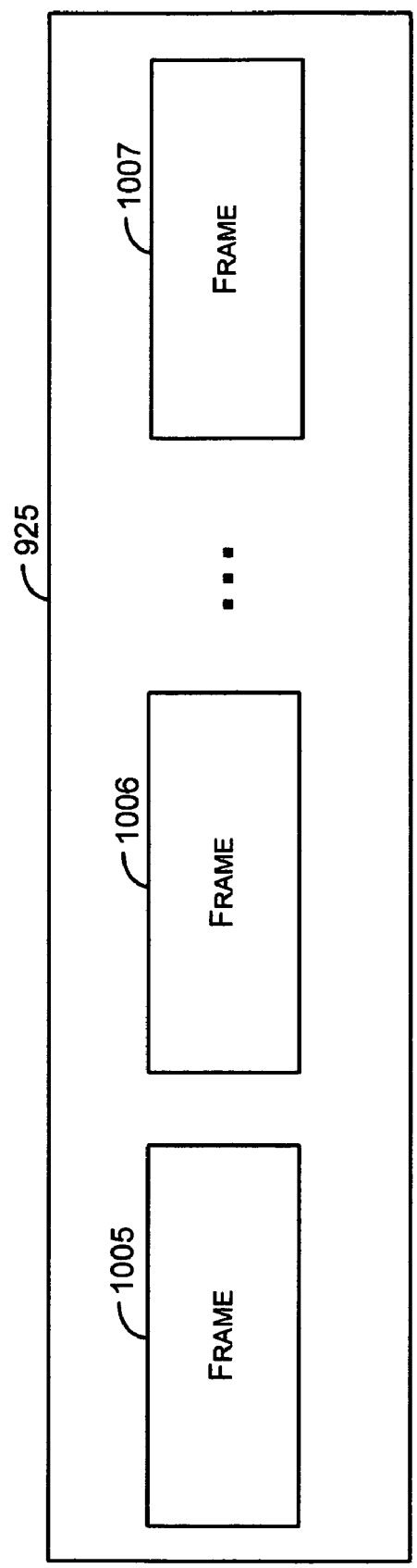
FIG. 10 is a block diagram representing a container including frames in accordance with various aspects of the invention.

FIG. 10 is a block diagram representing a container including frames in accordance with various aspects of the invention. The container 925 may include one or more frames 1005-1007 together with header information (not shown) and metadata (not shown). Logical frames may be constructed from the frames 1005-1007. Fewer, more, or other data may be included in the container 925 without departing from the spirit or scope of the present invention.

Figure 11:
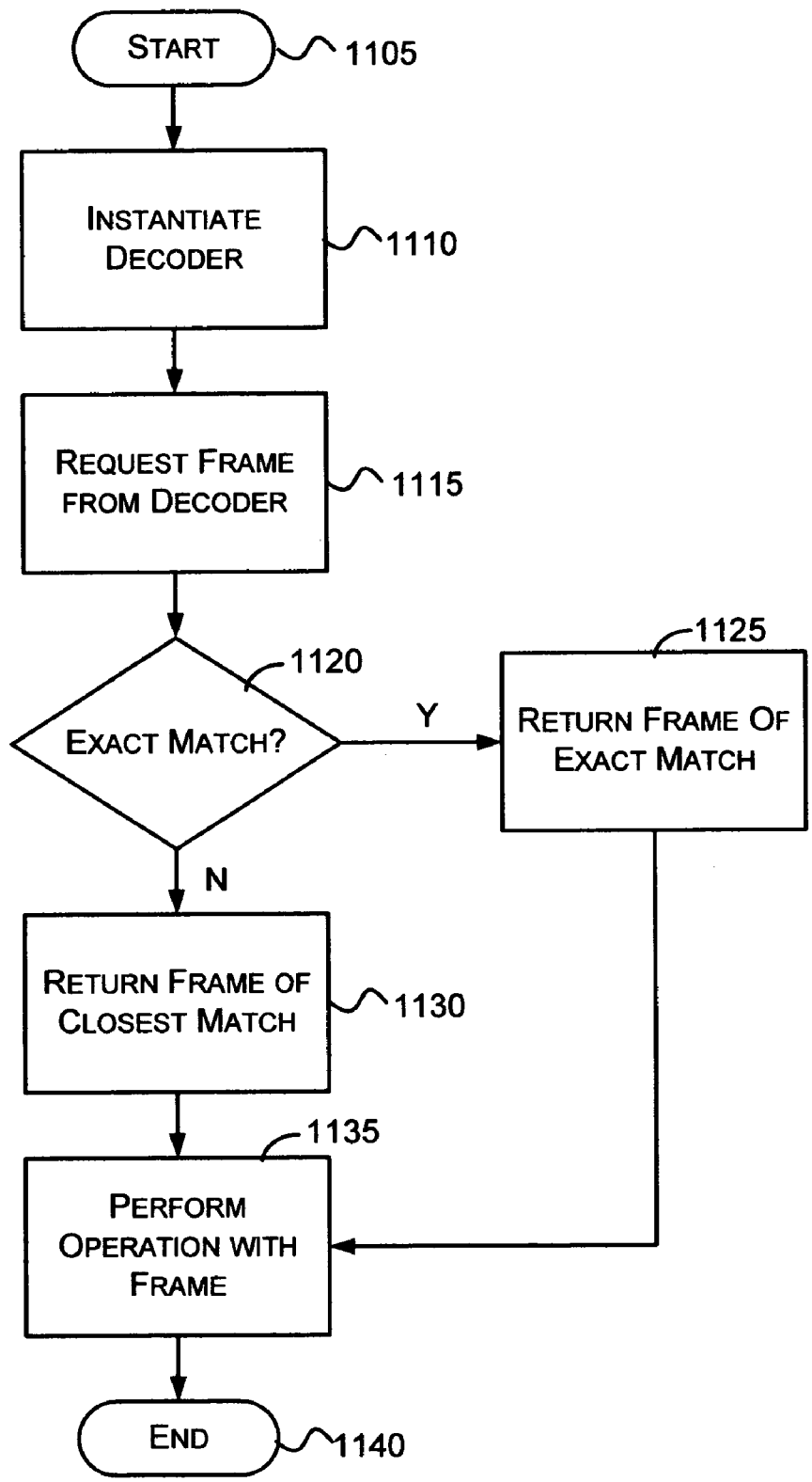
FIG. 11 is a flow diagram generally representing actions that may occur in obtaining a frame in accordance with various aspects of the invention.

FIG. 11 is a flow diagram generally representing actions that may occur in obtaining a frame in accordance with various aspects of the invention. At block 1105, the actions begin.

At block 1110, a decoder is instantiated. This may be done by calling a codecs component with a file name or stream object as previously indicated.

At block 1115, the requesting component requests a frame (by asking for a frame of a frame type) from the decoder. This may be done by calling a method of the decoder with a string or GUID identifying the requested frame type.

At block 1120, a determination is made as to whether an exact match exists for the requested frame. If so, the actions continue at block 1125; otherwise, the actions continue at block 1130. In some embodiments only exact matches are accepted. If a requesting component attempts to request a frame with a frame name or GUID that is not valid, an error is returned.

At block 1125, the frame is returned. The frame may be returned as reference (e.g., pointer) to an object having methods to access the data in the frame.

At block 1130, the frame that is the closest match to the requested frame is returned. For example, a thumbnail may be returned for a request for a preview frame.

At block 1135, the requesting component performs an operation with the frame as desired.

At block 1140, the actions end.

Figure 12:
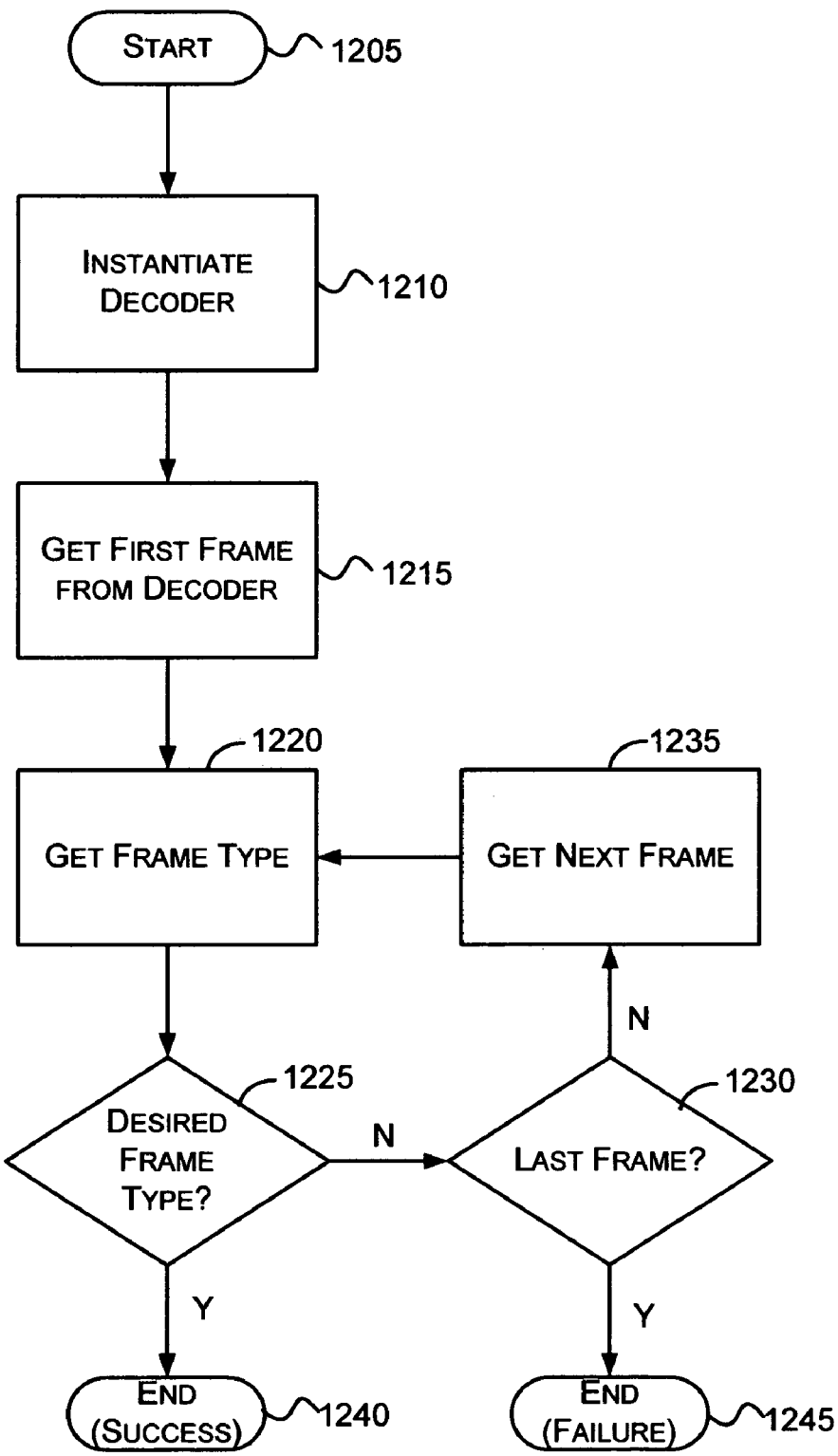
FIG. 12 is a flow diagram that generally represents other actions that may occur in obtaining a desired frame in accordance with various aspects of the invention.

FIG. 12 is a flow diagram that generally represents other actions that may occur in obtaining a desired frame in accordance with various aspects of the invention. In this embodiment, an interface is provided that allows a requesting component to determine what type of frame a frame is. Another interface allows the requesting component to loop through the available frames in a container. With both interfaces, the requesting component is able to enumerate the existing frames of a container and determine if a desired frame exists. At block 1205 the actions begin.

At block 1210, a decoder is instantiated. At block 1215, the first frame is obtained from the decoder. This may be accomplished by calling the decoder and providing an index of the first frame (e.g., 0).

At block 1220, the type of the frame is obtained. The frame object may include an interface that allows a component to ask what type of frame the frame object includes. In response to a query, the frame object may return a string or GUID, for example.

At block 1125, the requesting component determines whether the frame is of the type desired. If not, processing branches to block 1230; otherwise, processing branches to block 1240.

At block 1230, a determination is made as to whether the current frame is the last frame of the container. If so, processing branches to block 1245; otherwise, processing branches to block 1235. The decoder may provide an interface that allows a requesting component to query how many frames exist in a container. If the requesting component keeps track of the frames it has requested, it can know when it has obtained all the available frames.

At block 1235, the next frame is obtained from the decoder. The actions associated with 1220-1235 may be repeated until either all the frames in the container are exhausted or until a desired frame type is found.

At block 1240, the actions end in success having found the desired frame. At block 1245, the actions end in failure having not found the desired frame before running out of frames.

In some embodiments, both the ability to retrieve a frame by name (e.g., frame type) and to query for a frame type may be provided.

As can be seen from the foregoing detailed description, there is provided a method and architecture for obtaining a desired frame by name and to identify a selected frame. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions which when executed perform a method for returning a frame in response to a request for a frame that identifies the type of frame requested, comprising:

receiving a request at a decoder from a requesting component for a frame of an image having multiple frames each of a different type, wherein a plurality of the frames of the image is stored in an image container, wherein the request includes an identifier that identifies the type of the requested frame, wherein a frame comprises data that may be used to display a view of the image, and wherein the type of each frame comprises one of a thumbnail type, a full-resolution type, an embedded preview type, a fast preview type, or a raw sensor data type, wherein the decoder is configured to recognize a canonical set of frame names corresponding to each frame type such that each frame type is identifiable by its corresponding name;

locating the requested frame via the identifier; and providing a reference to the requested frame such that the requesting component determines the type of the received frame based on the request that identifies the type of the requested frame rather than based on an evaluation of the characteristics of the frame received in response to the request.

2. The computer-readable storage medium of claim 1, wherein the canonical set of frame names is fixed.

3. The computer-readable storage medium of claim 1, wherein the frame is constructed in response to the request.

4. The computer-readable storage medium of claim 1, wherein the identifier comprises a string.

5. The computer-readable storage medium of claim 4, wherein the string comprises a name that identifies the type of frame.

6. The computer-readable storage medium of claim 5, wherein the request is received though an application programming interface.

7. The computer-readable storage medium of claim 1, wherein the identifier comprises a globally unique identifier.

8. The computer-readable storage medium of claim 1, further comprising instantiating a decoder to interpret data in a container including the frame, wherein the decoder is adapted to obtain the frame from the container via the identifier.

9. The computer-readable storage medium of claim 1 wherein a frame of the type specified by the identifier is not located, and further comprising:

selecting a type different from the requested type that is closest in size to the requested type and providing a reference to the frame of the different type.

10. In a computing environment, a method for returning a frame in response to a request for the frame that identifies the type of frame requested, the method comprising:

receiving a request at a decoder from a requesting component for a frame of an image having multiple frames each of a different type, wherein a plurality of the frames of the image is stored in an image container, wherein the request includes an identifier that identifies the type of the requested frame, wherein a frame comprises data that may be used to display a view of the image, and wherein the type of each frame comprises one of a thumbnail type, a full-resolution type, an embedded preview type, a fast preview type, or a raw sensor data type, wherein the decoder is configured to recognize a canonical set of frame names corresponding to each frame type such that each frame type is identifiable by its corresponding name;

locating the requested frame via the identifier; and providing a reference to the requested frame such that the requesting component determines the type of the received frame based on the request that identifies the type of the requested frame rather than based on an evaluation of the characteristics of the frame received in response to the request.

11. The method of claim 10, wherein the reference comprises a pointer to an object.

12. The method of claim 10, wherein the frame is created from a physical frame stored in the container.

13. The method of claim 12, wherein the frame is stored in cache after creation.

14. The method of claim 10, wherein the identifier comprises a string that describes the frame.

15. The method of claim 10, wherein the identifier comprises a globally unique identifier that identifies an image type of the frame.

16. In a computing environment, a method performed by a processor of a computer for requesting each available frame in a frame container to determine whether a desired frame exists, the method comprising:

obtaining a first frame from a decoder by calling a function of the decoder and providing an index of the first frame, wherein the first frame is stored in a frame container with at least one other frame, and wherein each frame in the container is of a different type that is identifiable by a name of the frame type, wherein the decoder recognizes a canonical set of frame names corresponding to each frame type such that each frame type is identifiable by its corresponding name;

querying the decoder for the type of the first frame;

in response to the query, receiving the name of the first frame, the name comprising a string;

determining whether the first frame is of the desired type by comparing the received name to the name of the desired frame type;

upon determining that the first frame is not the desired type, obtaining a second frame from the decoder by calling the function of the decoder and providing an index of the second frame;

querying the decoder for the type of the second frame;

in response to the query, receiving the name of the second frame, the name comprising a string; and determining that the second frame is of the desired type by comparing the received name of the second frame to the name of the desired frame type.

* * * * *